United States Patent [19]

Wlodarczyk

[11] Patent Number: 5,600,070
[45] Date of Patent: *Feb. 4, 1997

[54] FIBER OPTIC COMBUSTION PRESSURE SENSOR WITH IMPROVED LONG-TERM RELIABILITY

[76] Inventor: Marek Wlodarczyk, 6865 Vachon Dr., Birmingham, Mich. 48301

[*] Notice: The term of this patent shall not extend beyond the expiration date of Pat. No. 5,390,546.

[21] Appl. No.: 390,970

[22] Filed: Feb. 21, 1995

Related U.S. Application Data

[63] Continuation-in-part of Ser. No. 86,245, Jul. 7, 1993, Pat. No. 5,390,546.

[51] Int. Cl.⁶ .................................................. G01L 7/08
[52] U.S. Cl. ............................................................. 73/715
[58] Field of Search ........................ 73/35.01, 35.14, 73/715, 652, 653, 654, 116, 117.2, 117.3, 115

[56] References Cited

U.S. PATENT DOCUMENTS

| | | | |
|---|---|---|---|
| 3,373,401 | 3/1968 | Bayer | 73/653 |
| 3,831,137 | 8/1974 | Cuomo | 340/8 R |
| 4,293,188 | 10/1981 | McMahon | 350/96.29 |
| 4,459,477 | 7/1984 | Asawa et al. | 73/705 |
| 4,493,208 | 1/1985 | Grover | 73/117.3 |
| 4,521,683 | 6/1985 | Miller | 73/715 |
| 4,620,093 | 10/1986 | Barkhoudarian et al. | 73/705 |
| 4,753,109 | 6/1988 | Zabler | 73/115 |
| 4,781,059 | 11/1988 | Suzuki et al. | 73/117.3 |
| 4,860,586 | 8/1989 | Miers et al. | 73/517 R |
| 4,932,262 | 6/1990 | Wodarczyk | 73/705 |
| 5,072,617 | 12/1991 | Weiss | 73/715 |
| 5,207,766 | 5/1993 | Conforti et al. | 73/653 |
| 5,249,163 | 9/1993 | Erickson | 73/653 |
| 5,317,929 | 6/1994 | Brown et al. | 73/653 |
| 5,349,850 | 9/1994 | Young | 73/116 |
| 5,390,546 | 2/1995 | Wlodarczyk | 73/116 |

FOREIGN PATENT DOCUMENTS

| | | | |
|---|---|---|---|
| 1024266 | 2/1958 | Germany | 73/715 |
| 0207012 | 10/1985 | Japan | 73/653 |

Primary Examiner—Richard Chilcot
Assistant Examiner—George M. Dombroske
Attorney, Agent, or Firm—James M. Deimen

[57] ABSTRACT

A cup shaped diaphragm having varying thicknesses reduces stress on the diaphragm and increases reliability of a fiber optic diaphragm sensor. The hermetic seal between the optical fiber and the ferrule body is removed from proximity of the diaphragm and is located near the opposite end of the ferrule. The effects on the ferrule of overpressure on the diaphragm are controlled by angling a portion of the ferrule tip adjacent the diaphragm. A method of sealing and locating the optical fiber to the ferrule of the sensor is described.

15 Claims, 6 Drawing Sheets

FIBER OPTIC COMBUSTION PRESSURE SENSOR WITH IMPROVED LONG-TERM RELIABILITY

CROSS REFERENCE TO RELATED APPLICATION

This application is a continuation-in-part of application Ser. No. 08/086,245, filed Jul. 7, 1993 U.S. Pat. No. 5,390,546 for Fiber Optic Diaphragm Sensors For Engine Knock And Misfire Detection.

BACKGROUND OF THE INVENTION

The field of the invention pertains to fiber optic sensors instantaneously sensitive to pressure or stress in a manner that causes a beam of light to be reflectively modulated in response to changes in pressure or stress on the sensor.

In particular, in the automotive field, the ability to continuously monitor internal combustion engines for pressure fluctuations can significantly improve engine efficiency, performance, reliability and operating costs. Most importantly, the level of emissions can be reduced over the 100,000 mile effective life of the engine emissions control systems to be required by the United States Environmental Protection Agency. In addition, open and closed loop controls based on pressure information permit lean-burn engine operation, a wider tolerance to fuel octane and acceptance of alternative fuels.

Two combustion parameters, engine knock and misfire, have a particularly significant effect on overall engine performance. Combustion knock causes increased fuel consumption, reduced engine torque and engine deterioration if left uncorrected. Eventually severe damage such as perforated pistons can occur.

Misfire can result in catalyst damage and degradation that eventually cause vehicle exhaust emissions to no longer meet current or proposed emission standards. With a design 100,000 mile catalyst life, the failure to detect and correct misfire could result in operation of the vehicle for a lengthy period of time, possibly many years, with an ineffective catalyst.

The California Air Resources Board has recently proposed regulations which will require vehicles to be equipped with on-board emission monitoring systems. Such systems, in particular, will require misfire monitoring. The Environmental Protection Agency is also considering regulations to require such monitoring systems.

A low cost, reliable cylinder-selective combustion pressure sensor would permit knock and misfire detection separately for each cylinder. In addition to signalling the malfunction to the vehicle operator, a real time solid state engine control could adjust specific cylinder parameters to correct for the malfunction. The majority of the presently available or proposed knock and misfire detection techniques provide information that is not cylinder specific and therefore has limited utility for real time corrective controls. However, some recent patents disclose cylinder specific sensors. These sensors generally fall into two categories, luminosity detectors and pressure detectors.

U.S. Pat. No. 4,919,099 discloses a probe insertable into the engine cylinder combustion chamber. The probe includes a light conductive rod and fiber optic transmission bundle connected to an opto-electronic detector for instantaneous detection of the luminosity of the combustion gases within the combustion chamber. U.S. Pat. No. 5,052,214, in a similar manner, utilizes a fiber optic probe and transmission cable to sense and transmit the instantaneous luminosity to an opto-electronic detector. International Application Publication WO 89/11031 and European Application Publication EP-392-650-A also disclose optical luminosity probes for engine combustion chambers.

U.S. Pat. No. 4,781,059 discloses an optical fiber pressure sensor comprising a plurality of fibers to transmit light to the sensor tip and a second plurality of fibers to transmit light from the tip to an opto-electronic detector. The tip comprises a reflective diaphragm sensitive to pressure changes within the combustion chamber. U.S. Pat. No. 4,924,870 to applicant discloses an optical fiber pressure sensor tip comprising a single optical fiber. The single fiber carries dual light beams of differing wavelengths as input and the reflected return light beams. One wavelength serves as a reference signal that is reflected by an optical filter. The other wavelength passes through the optical filter and is reflected and modulated by a moveable diaphragm sensitive to pressure changes. This particular fiber optic sensor is of very small size, being intended for the measurement of intra-vascular blood pressure in human patients.

Two other patents to the applicant, U.S. Pat. Nos. 4,932,262 and 4,932,263, disclose a well having an optical fiber passing therethrough. A pressure sensitive membrane encloses at least a portion of the well. The underside of the pressure sensitive membrane includes an optical grating that couples with the wavelength of the light beam in the optical fiber so as to modify the light beam in response to pressure induced movement of the membrane. By making the sensor with techniques common to the manufacture of integrated circuits on chips, the sensor may be made small and rugged enough to locate on a spark plug in direct exposure to the combustion chamber of an engine.

A published paper co-authored by the applicant is entitled "Microbending Losses of Metal Coated Single Mode, Multimode, and Cladding-Free Fibers," Society of Photo-Optical Instrumentation Engineers, Vol. 985 Fiber Optic and Laser Sensors VI (1988) and discloses the test results of microbending various optical fiber constructions. The test results indicate the various attenuations of light beams as a function of microbending displacement of the fibers and wavelength of the light beams.

A second published paper co-authored by the applicant is entitled "A Fiber Optic Sensor for Combustion Pressure Measurement in a Washer Configuration," Society of Photo-Optical Instrumentation Engineers, Vol. 840 Fiber Optic Systems for Mobile Platforms (1987), and discloses a washer configuration for placement between a spark plug and engine cylinder head. Changes in combustion chamber pressure cause changes in the preload on the washer configuration. The washer configuration comprises upper and lower serrated washer halves with a continuous loop of optical fiber placed between the serrated washer halves. One end of the loop extends to a source of light and the other end of the loop extends to a photodetector.

In-cylinder pressure transducers are currently being considered for advanced engine control systems. Since cylinder pressure is the fundamental thermodynamic variable, it is used to determine a variety of engine parameters for closed-loop controls. In-cylinder pressure transducers are commonly used to determine apparent rate of heat release and indicated mean effective pressure (IMEP). Cylinder pressure history is also used to determine the best air/fuel ratio in closed-loop controls, thereby significantly increasing fuel efficiency and reducing emission levels of polluting gases. In addition, in-cylinder pressure sensors are best suited to adjust an engine's operating state on a cylinder-to-cylinder basis to minimize torque variability for lean-burn operations.

In the area of engine diagnosis, in-cylinder pressure sensors provide a direct and deterministic misfire detection, while indirect torque-fluctuation-based techniques are hampered by their inability to distinguish misfire from factors such as incorrect spark-timing and rough driving conditions.

Under recently enacted California Air Resources Board Regulations, on-board misfire detection, as a part of the overall legislation-mandated exhaust emission reduction efforts, will become an important and integrated part of electronic engine monitoring and control systems. Similarly, knock control is widely accepted as a major aspect of engine controls. In-cylinder pressure sensing is best suited to detect high frequency knock signals without being complicated by factors such as cylinder-to-cylinder variability, shock, vibrations, and signal phase-delays, plaguing externally mounted sensors.

The benefits of combustion pressure-based engine controls have long been recognized. However, commercial applications have been largely limited due to the lack of suitable pressure sensors that meet performance, size, and cost requirements. A major obstacle in developing viable and cost-effective combustion pressure sensors has been to overcome sensor performance degradation caused by adverse operating conditions, which include high combustion temperatures and strong electromagnetic interference (EMI). Long-standing and extensive efforts have been devoted to develop piezoelectric- and piezoresistive-type combustion pressure sensors, with limited successes in overcoming two inherent limiting factors. The first limiting factor is that sensing crystals cannot withstand high temperatures (above 300° C.). Therefore, a transfer-pin is necessary to connect a pressure sensing diaphragm to the crystal, thereby locating the temperature-sensitive crystal away from high combustion temperatures. Such a construction is complicated in that temperature gradients presented to the mechanical assembly may induce response characteristics variations, such as hysteresis and other errors.

The second limiting factor is that signal conditioning electronics must be located at the sensor head to combat strong EMI effects. This routinely subjects the components to temperatures well over 125° C., and complicates reliability and cost considerations. Along with the delicate sensing crystals, the electronic chip on the sensor head must be well shielded both electrically and thermally, leading to an enlarged sensor profile.

Consequently, these stand-alone sensors present difficulties in engine mounting as electronically controlled, multi-valve engines offer little available space. Further, caution must be exercised to avoid complications induced by ground-loops in an engine environment. So far, sensors based on the conventional technologies have not been able to meet overall cost, reliability, size, and high-temperature durability requirements for engine control applications.

Fiber-optic sensors for high-temperature pressure-sensing applications generally consist of fused-silica optical fibers embedded in metal-sensing fixtures, and are powered remotely by electro-optical modules. All components in the sensor heads are made of high-temperature-resistant materials that function without provisions for cooling or heat shielding. The sensors are electrically passive such that EMI and ground-loop problems are obviated. Although extensive fiber-optic sensor development work has been reported, the effort has been mainly toward the aerospace industry and more recently biomedical applications using low-cost disposable devices.

Adaptation of fiber-optic sensors to automotive applications is particularly challenging because: (1) The sensor must survive combustion temperatures up to 650° C., (2) the sensor must provide accurate readings over operating pressure, temperature, vibration, and electromagnetic interference ranges encountered in the engine environment, (3) the sensor must maintain required reliability and accuracy up to over 100,000 miles of car operation, and (4) the sensor must meet the technical requirements at an extremely low cost.

Among various types of fiber-optic sensors, the most promising candidate for low-cost automotive applications is the simple intensity-modulated sensor. This sensor utilizes an optical fiber in front of a flexing diaphragm for optical reflection measurement of pressure-induced deflections. This sensor is disclosed in my parent patent application.

By employing this sensing principle coupled with a hermetically sealed sensor structure to eliminate diaphragm oxidation at high temperatures, and as discussed in my patent application, a sensor can operate at extreme combustion temperatures. However, the use of a flat diaphragm in this design can result in poor reliability over long-term exposure to high pressure and temperature cycling.

The primary reliability problem of flat diaphragm-based sensors for combustion pressure monitoring has to do with potential diaphragm fatigue resulting from continuous exposure to hundreds of thousands of pressure cycles. Since diaphragm deflections required in intensity encoded fiber optic designs are typically between 10 and 20 microns, high stress regions can be created at the diaphragm's center and at the clamped edge. While using a thicker diaphragm may result in reduced stresses and improved reliability, diaphragm deflection becomes too low for required optical signal changes.

The other problem of the diaphragm-based fiber optic sensors is related to the location of the laser welded area combining the diaphragm and the housing. The exposure of that area to extreme combustion temperatures over long time may cause sensor failure due to diaphragm yield.

Finally, flat diaphragm-based fiber optic sensor designs require the use of thick diaphragms for overpressure protection. For a typical overpressure range of 2000 psi, this means that diaphragm thickness may be increased as much as 50% reducing its deflection as much as 75% compared to a diaphragm designed for 1000 psi.

Thus, this disclosure describes a number of improvements in the metal diaphragm-based fiber optic combustion pressure sensor for improved reliability under conditions of long-term pressure and temperature cycling. The design also reduces the sensor's inaccuracies resulting from combustion flame kernel effect and provides for improved overpressure protection compared to a flat-disk based design.

SUMMARY OF THE INVENTION

The configuration of a varying thickness diaphragm for a fiber-optic sensor permits reduced stress levels in the diaphragm and an increase in deflection at the center point of the diaphragm. Location of the hermetic seal between the optic fiber and the ferrule carrying the optic fiber is removed from proximity near the diaphragm and placed away from potential heat cycle degradation.

Overpressure effects to the sensor are minimized by polishing a portion of the diaphragm end of the sensor body to a taper, integrating a metal stop within the fiber ferrule or adding a separate ferrule to surround the optical fiber and polishing a part of the ferrule to an angle.

The invention further comprises means for sealing the ferrule to the optic fiber to prevent oxygen infiltration and the consequent degradation to the fiber.

The invention also comprises a process for sealing the fiber to the ferrule to isolate the cavity through the body of the sensor.

The configuration of the fiber optic diaphragm sensor permits direct exposure of the diaphragm to the combustion chamber and therefore the sensor directly senses the pressure fluctuations in the chamber. This is distinguished from washer-type sensors which are located under spark plugs or bolt heads and therefore indirectly monitor combustion pressure. Direct exposure sensors tend to provide improved signal to noise ratio, in particular at low pressures, and therefore offer better performance. The direct exposure, however, subjects the sensor, in particular, the diaphragm at the tip to the instantaneous temperatures in the combustion chamber.

DESCRIPTION OF THE PREFERRED EMBODIMENTS

Figure 1:
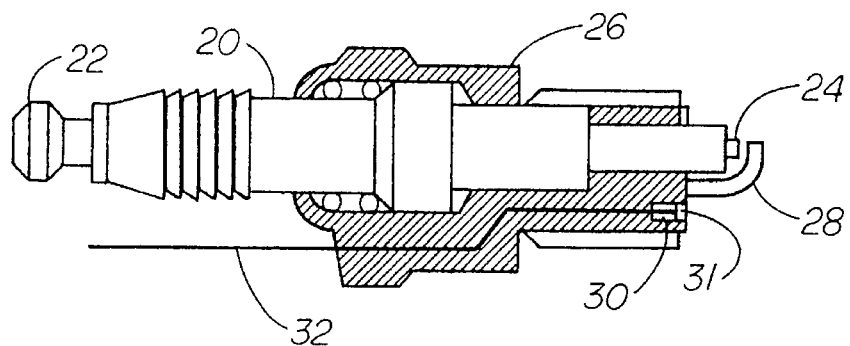
FIG. 1 is a side cross-section of a spark plug, incorporating a diaphragm fiber optic sensor.
Figure 2:
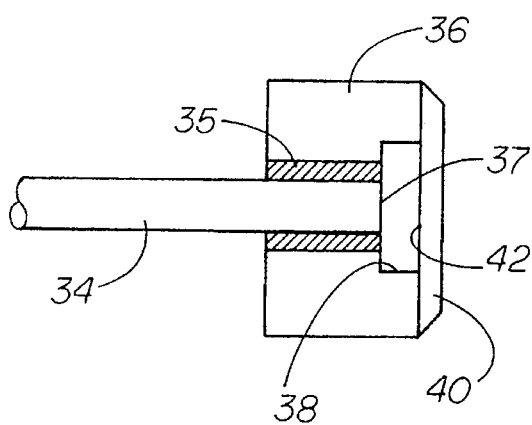
FIG. 2 is a typical cross-section of a diaphragm type fiber optic sensor.

In FIGS. 1 and 2 the spark plug shown includes a conventional ceramic core 20 that contains a conductor 22 leading to the center pole 24. The ceramic core 20 is permanently affixed in a metal sleeve 26 to which is attached the other pole 28. In the typical conventional spark plug the ceramic core 20 is concentric with the metal sleeve. However, as shown in FIG. 1 the core 20 is radially offset from the centerline of the sleeve. The offset provides additional metal thickness in the sleeve 26 for a sensor 30 and fiber optic transmitting cable 32 leading to the sensor.

The sensor 30 is located in a small bore or cavity in the metal sleeve with the sensor tip exposed 31 to combustion pressure and temperature adjacent the poles 24 and 28 of the spark plug. A simple form of a diaphragm sensor is illustrated in FIG. 2. The fiber 34, which may be a fiber bundle, is fitted within a sensor body 36 and terminates at a small round cavity 38. A ferrule 35 surrounds the tip end 37 of the fiber 34. The diaphragm 40 covers the cavity 38. The diaphragm 40 is mirror finished 42 on the cavity side. The light delivered by the fiber 34 to the sensor 30 is reflected back into the fiber 34 by the mirror finish 42 on the back of the diaphragm. Thus the amount of light reflected by the diaphragm 40 back into the fiber 34 increases and decreases with increases and decreases in pressure on the diaphragm.

Increased pressure on the diaphragm 40 causes the diaphragm to flex into the cavity 38 and in so doing the light reflected back is modulated. The very small diaphragm detector 30 shown as inserted in the spark plug of FIG. 1 is subjected to the extreme of combustion temperature in close proximity to the poles 24 and 28. Therefore, the tip of the glass fiber 34 is subjected to potentially damaging temperatures and therefore a degradation of signal to noise ratio. Thus, even though the sensor need not be calibrated against pressure or temperature since only relative measurements are required for knock or misfire identification, a good signal to noise ratio is important.

Figure 3:
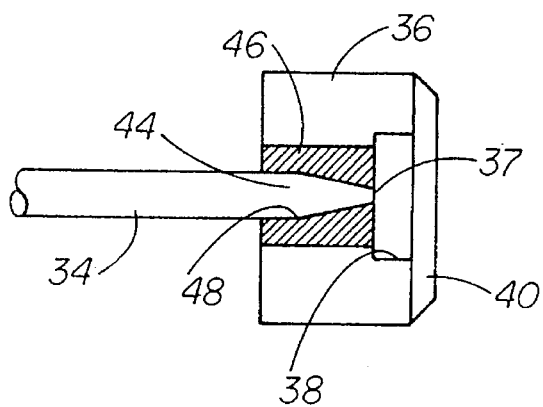
FIG. 3 is an illustration of the tapered end of an optical fiber.

A diaphragm sensor should also have a large band width and low cost. Because of the small size of the diaphragm sensor in a spark plug and overpressure requirements, diaphragm deflection is quite small, on the order of 15 microns. This small deflection limits optical modulation and consequently signal to noise ratio and system frequency response. FIG. 3 illustrates the first of two improvements in a diaphragm sensor that significantly increase the signal to noise ratio without significantly increasing sensor cost. In a diaphragm sensor as pressure increases, the diaphragm is deflected inward toward the tip end of the optical fiber. The amount of light collected by the tip end of the fiber, after reflection from the diaphragm, increases monotonically with pressure.

For a given sensor size and diaphragm thickness, optical modulation depth can be increased through a suitable selection of fiber core diameter and numerical aperture (NA). The numerical aperture dependence is almost linear and the sensor size dependence is approximately linear with an inverse of fiber diameter. Thus, maximum modulation can be obtained for fibers with small diameters and large NA. A high NA also favors the optical power carrying capability of the fiber, which is a function of the square of the NA. However, reduced fiber diameter reduces power level by a square function of the diameter.

For example, modulation levels of 3 mm diameter sensors range between 8% and 12%, based on the use of a 100 micron thick diaphragm and a 100 micron diameter 0.29 NA fiber. Typical signal to noise ratios are in the range of 100 to 200 for such sensors when energized by a relatively low cost opto-electronic transceiver.

Figure 4:
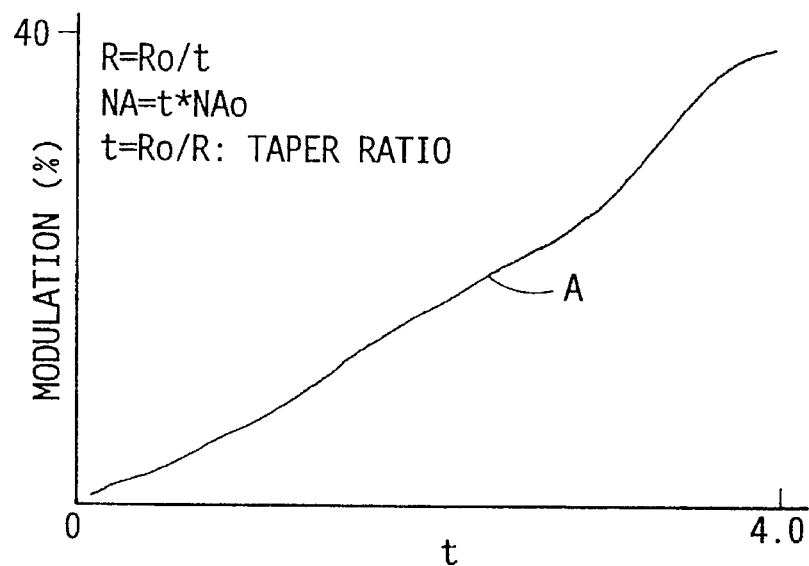
FIG. 4 is a graph of modulation depth increase versus taper ratio for the tapered fiber of FIG. 3.

In FIG. 3 the fiber or fiber bundle 34 is tapered 44 within the conical ferrule 46. The conical taper 44 adjacent the tip end 37 results in both a size reduction and an increase in NA for the tip end. The increase in NA is approximately proportional to the ratio of untapered to tapered fiber tip end diameters. FIG. 4 illustrates the theoretical difference between the modulation depth and the taper ratio by the curve A. An improvement in modulation depth approaching 40% can be obtained by drawing down the fiber 34 to a taper ratio of 4 to 1.

While the fiber conical taper 44 adjacent the tip end 37 increases the modulation depth significantly, the transmission losses also increase due to the leakage of higher-order guided modes in the tapered region of the fiber. These transmission losses can be significantly reduced by plating a thin layer 48 of reflective metal onto the taper surface. By the selection of a suitable metal, such as gold, the metal layer serves as an interface bonding material for brazing the conical ferrule 46 to the fiber.

Figure 5:
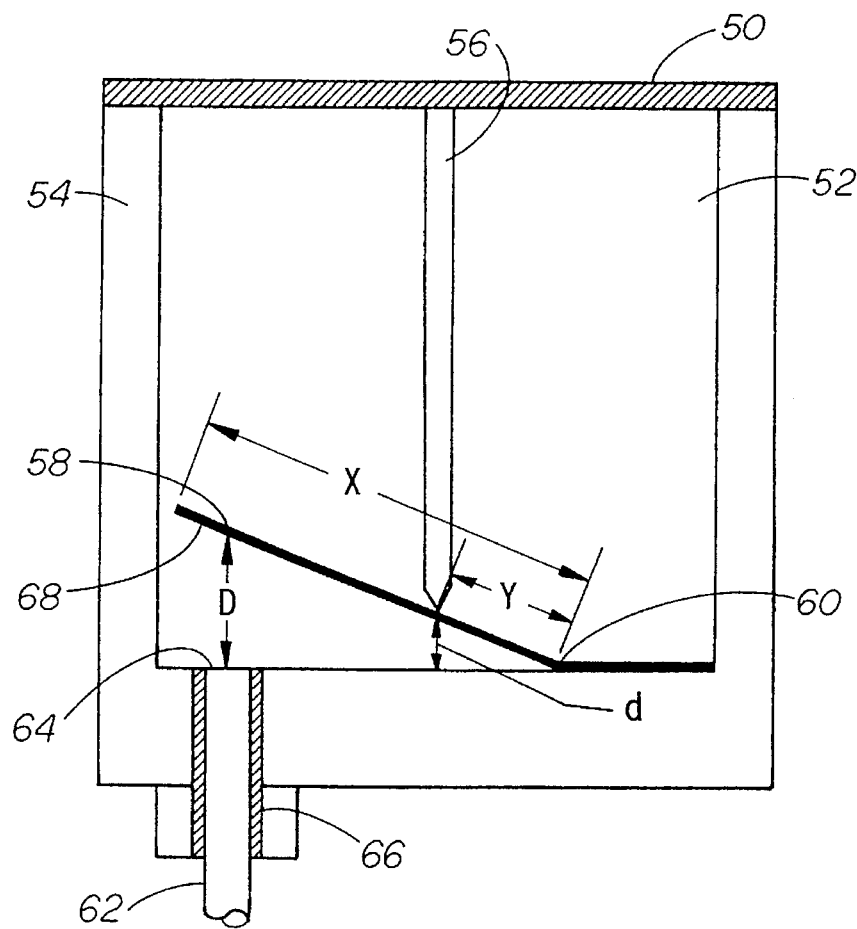
FIG. 5 is an illustration of a mechanically leveraged dual diaphragm sensor structure.

In FIG. 5 an alternative improvement to the diaphragm sensor not only increases modulation depth but also spaces the tip end of the optical fiber a significantly greater distance from the diaphragm exposed to the heat in the cylinder combustion chamber adjacent the spark plug electrodes. Specifically, the mechanical diaphragm 50 is mounted over the cavity 52 opening in the sensor body 54. Within the cavity 52 is a transfer pin 56 mechanically connected to the center of the diaphragm 50 where maximum diaphragm deflection occurs. An optical diaphragm 58 is hinged at a fulcrum location 60 and urged against the transfer pin 56 by the resistance to bending of the optical diaphragm at the fulcrum location.

Figure 6:
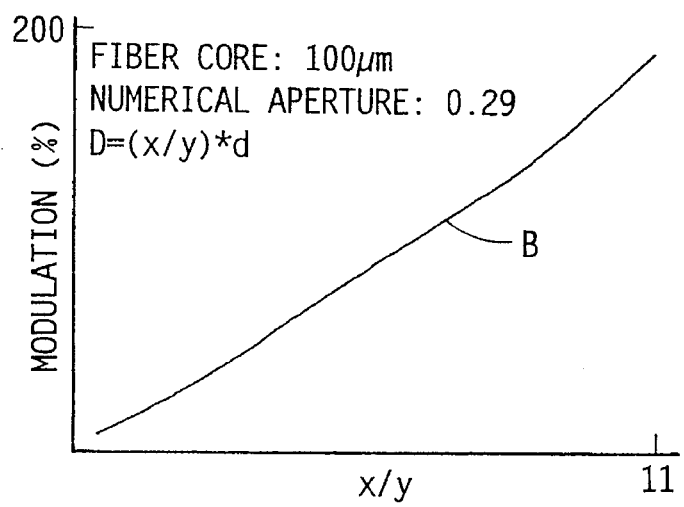
FIG. 6 is a graph of modulation depth increase versus leverage ratio for the sensor structure of FIG. 5.

An optical fiber or fiber bundle 62 penetrates the sensor body 54 with the tip end 64 in optical communication with the cavity 52. A ferrule 66 seals the optical fiber 62 to the sensor body 54. The tip end 64 is spaced from the fulcrum 60 a considerable distance more than the engagement of the transfer pin 56. The side 68 of the optical diaphragm 58 facing the tip end 64 is reflective to efficiently return light to the optical fiber 62. Thus, displacement of the mechanical diaphragm 50 in response to pressure changes in the combustion chamber causes displacement of the optical diaphragm 58 about the fulcrum 60 and significantly increased displacement of the optical diaphragm relative to the tip end 64 of the optical fiber 62. In FIG. 6, the curve B illustrates the modulation depth increase versus the leverage ratio defined as the total length (X) of the optical diaphragm 58 from the fulcrum 60 to the distance (Y) of the transfer pin 56 to the fulcrum 60 along the optical diaphragm 58. In FIG. 6 the results for a 3 mm transfer pin 56 and 3 mm diameter sensor body 54 are presented. For a mechanical diaphragm 50 deflection of 20 microns, the optical diaphragm 58 moves about 200 microns at an X/Y leverage ratio of 10:1. The result is a modulation depth increase of about 160%.

Depending on the length of the transfer pin 56, temperatures up to 800° C. adjacent the mechanical diaphragm 50 may be accommodated. The separation of the mechanical and optical diaphragm functions lessens or removes a critical design aspect present with conventional diaphragm-based fiber optic pressure sensors. The separation increases the modulation levels and decreases the fiber 62 temperature at the tip end 64 and ferrule 66.

Usually the choice of diaphragm is a compromise between diaphragm strength and diaphragm reflectivity. High diaphragm reflectivity and reflectivity stability under high temperatures are the primary requirements for sensitive and stable diaphragm sensors. Materials with such reflective characteristics such a platinum, have relatively low strength and therefore can limit operating pressure ranges. Inconels and special grades of stainless steels are usually the best compromises.

By separating the diaphragm functions in the new design, the mechanical diaphragm 50 selection is based on mechanical characteristics such as high strength, large deflection and hysteresis-free operation under conditions of high temperatures and pressures. Thus, any metal or alloy possessing the necessary characteristics but without regard to reflectivity might be selected.

The optical diaphragm 58, however, may be selected on the basis of best reflectivity and ability to repeatedly flex about the fulcrum 60 the slight amount under displacement by the transfer pin 56. Thus, platinum is a particularly good choice for the optical diaphragm material.

The fiber tip 64 and ferrule 66 temperature can be controlled by the selection of the transfer pin 56 length and material and the sensor body 54 material and shape. With the spark plug integrated sensor, the use of a 3 mm long transfer pin 56 may reduce fiber tip 64 temperature by as much as 200° C. in comparison with a combined function diaphragm sensor. Such a temperature drop results from the effect of engine coolant flowing in the spark plug proximity.

A critical requirement for a commercially viable misfire and knock detection system is low cost. While the cost of the diaphragm type sensors above can be very low the total system cost must be acceptably low. When a conventional opto-electronic coupler is used the cost may be unacceptably high because the opto-electronic coupler is the most expensive part of the transceiver.

Such a transceiver comprises one or more light emitting diodes (LEDs) and one or more photodiodes. Presently available bi-directional opto-electronic couplers are unacceptably expensive for low cost automotive applications. LEDs may be also expensive if their beam sizes are small, as typically required for conventional couplers.

Figure 7:
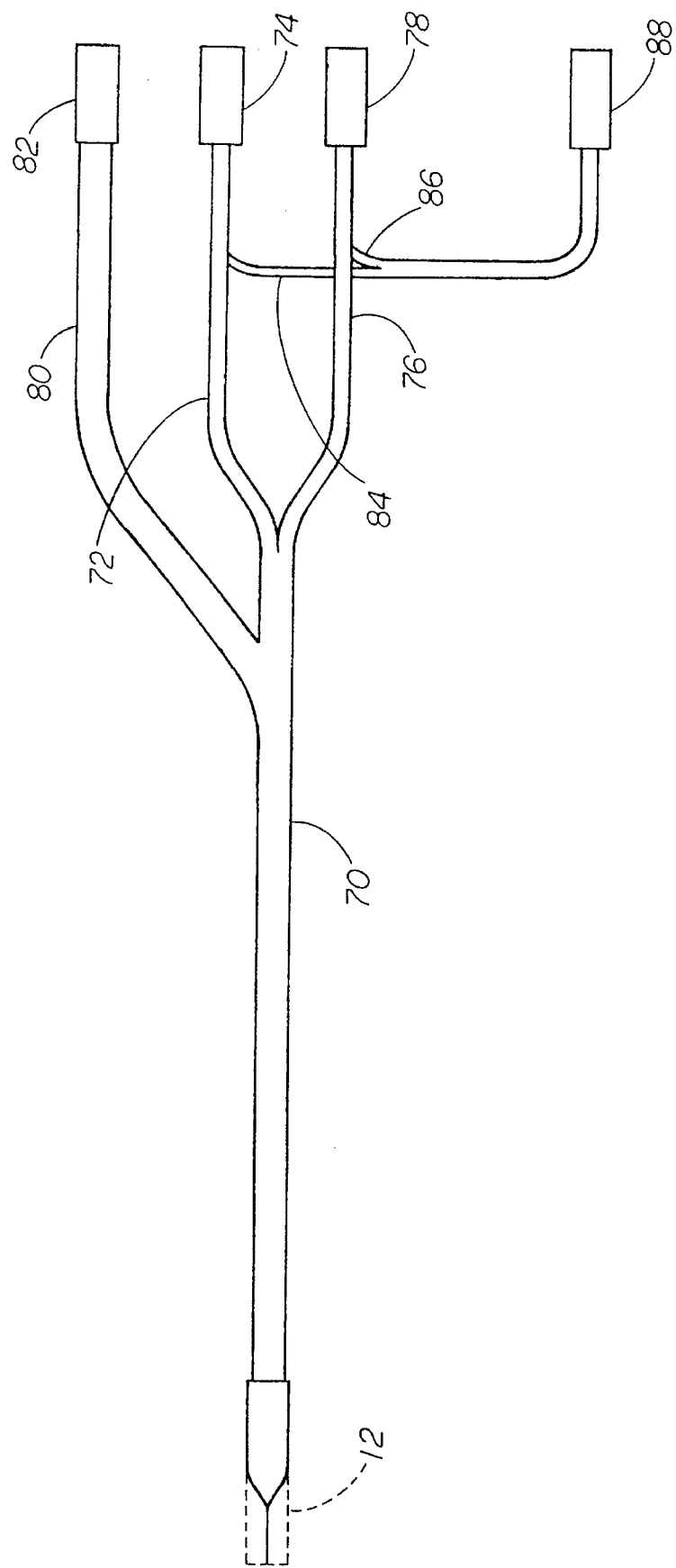
FIG. 7 is an illustration of a distributed fiber optic bundle from the sensor to the sources of light and the detectors.

A low cost and effective solution for the opto-electronic coupler is illustrated in FIG. 7. This solution can offer virtually the same optical power as much more expensive couplers, permits the use of individual low cost LEDs, and individual low cost photodiodes. The basis of the solution is the use of low cost borosilicate fiber bundles tapered or untapered into the diaphragm sensor as explained above and a divisional arrangement of the fibers at the opto-electronic coupler end.

As shown in FIG. 7 the fiber bundle 70 extending from the sensor is divided at the coupler end into dedicated subgroups for each opto-electronic element. For example, eight fibers 72 extend to LED 74 and another eight fibers 76 extend to LED 78. Sixteen fibers 80 extend to the photodiode in the measurement detector 82. Three fibers 84 and 86 from each LED 74 and 78 extend directly to the reference detector 88. With such an arrangement the light from the LEDs is efficiently coupled into the transmitting fiber bundle 70 and into and from the sensor.

As an example, 50 micron borosilicate fibers (extensively used in fiber optics) may be utilized. Depending on LED and sensing fiber sizes, as many as 100 fibers can be used in the transmitting fiber bundle. Alternatively, a larger (150 micron) diameter and fewer fibers can be used. Regardless of the number of fibers, the fibers in the fiber bundle 70 that transmit light from the LEDs and return light to the measurement detector 82 may be fused and tapered at the sensor end to a diameter suitable for the tip end 37 (FIG. 3). Such a taper, which may be fabricated in a straight forward way by thermal fusing of borosilicate fibers and pulling during fusing.

The number of fibers in the subgroups connected to either the LEDs or the photodiodes may be adjusted to optimize the power received by a photodiode. In effect, the number of fibers in each subgroup is determined by the maximum power to be received at the measurement detector 82. The various losses are distributed to obtain maximum received power even though some individual collection efficiencies such as at the LEDs are compromised. Low cost LEDs typically launch divergent and large light beams. Large bundles of fibers can be used to collect the light from the LEDs. With borosilicate fibers having typically high numerical apertures of 0.5 to 0.6, the collection efficiency into a fiber bundle is enhanced. At the tapered end of the fiber bundle, taper loss is reduced by a metal coating over the taper and inside the connector 12.

Figure 8A:
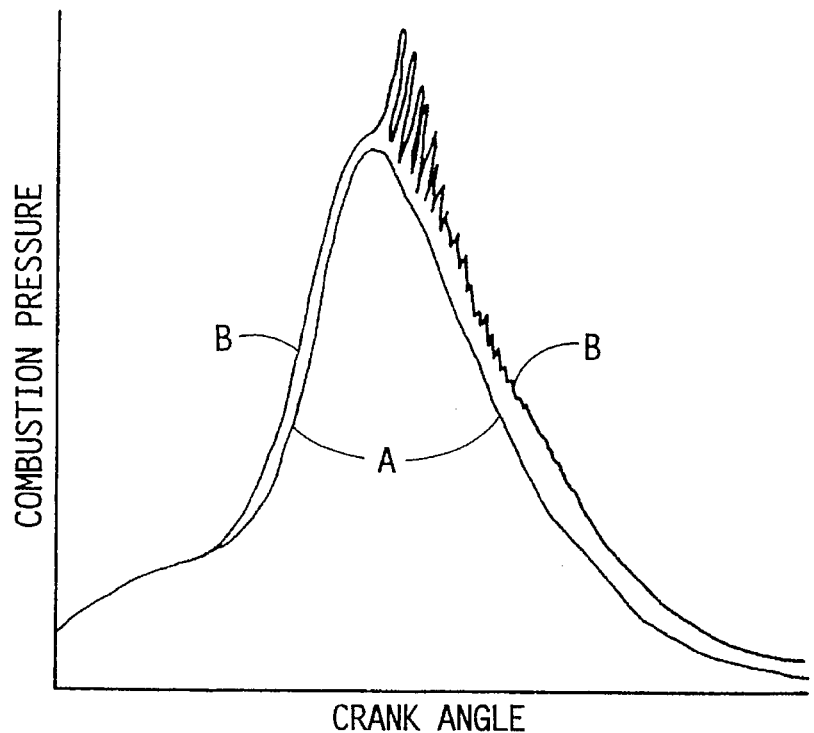
FIGS. 8a and 8b illustrate the effect of knock on the cylinder pressure waveform.
Figure 8B:
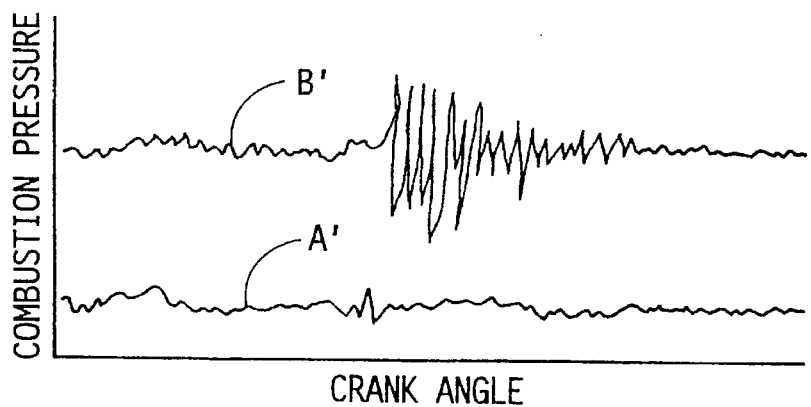

FIGS. 8 and 9 illustrate respectively the superposition of the knock signal on the pressure waveform and the misfire displacement or dip of a portion of the pressure waveform. Thus, in FIG. 8a curve A is the typical or expected waveform for combustion pressure in the cylinder and curve B exhibits the effect of knock on the waveform. Knock clearly causes a relatively high frequency pressure fluctuation which can with suitable electronic analysis in the ECM be isolated and amplified as shown by the comparison of curves A' and B' in FIG. 8b.

Figure 9A:
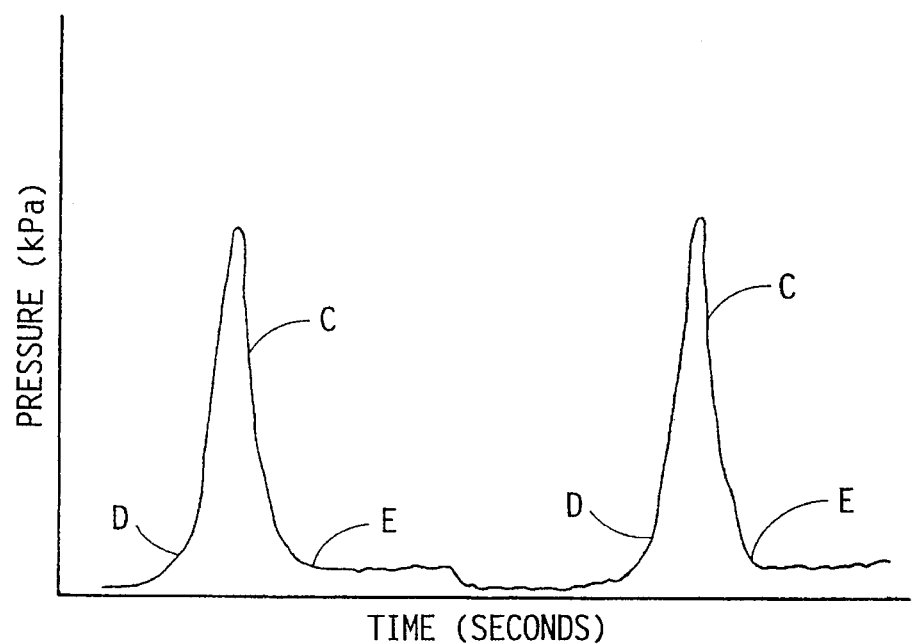
FIGS. 9a and 9b illustrate the effect of misfire on cylinder pressure waveform.
Figure 9B:
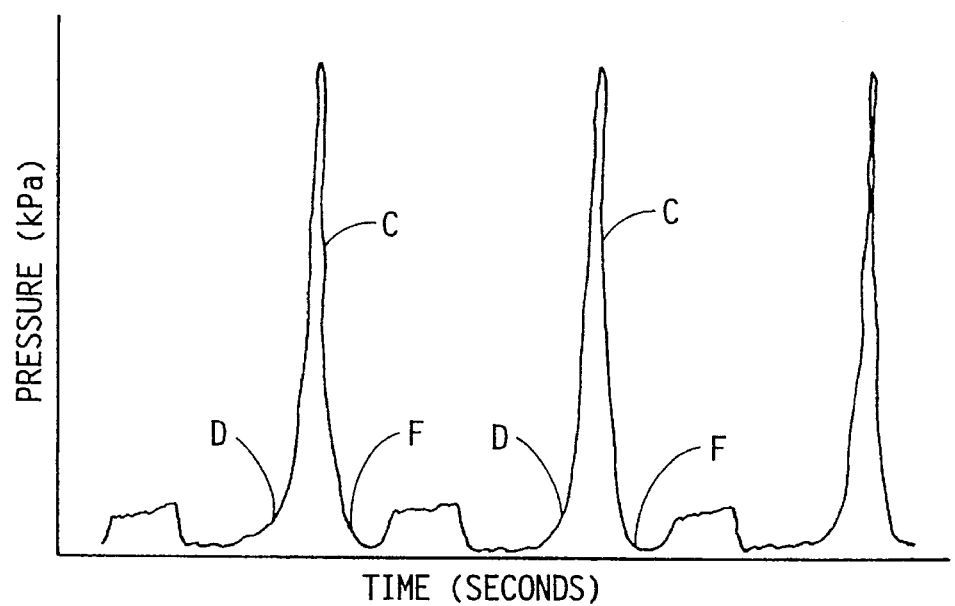

In FIG. 9a a multiple pressure waveform for cylinder pressure is illustrated by Curve C. The "knee" at the beginning D and end E of each compression and combustion stroke are substantially similar in shape (substantially symmetric about the peak of curve C). In FIG. 9b, however, the symmetry of curve C about the peak is lost at the "knees". Rather, a pronounced displacement downwardly or dip is exhibited at F in the knee of the curve following the peak.

For knock or misfire detection an autocorrelation technique can uniquely identify knock or misfire. In the absence of knock or misfire, the output of the autocorrelation function applied to the pressure waveform stored in memory in the ECM and the waveform of a particular cylinder results in essentially a zero value. In the presence of knock or misfire, the normalized output of the autocorrelation function approaches unity resulting in the unique detection of either or both of the two combustion anomalies. The physical embodiment of the autocorrelation function can be realized in digital form using Digital Signal Processing integrated circuits which offer the capabilities of sufficiently high speed real time autocorrelation calculations.

Figure 10:
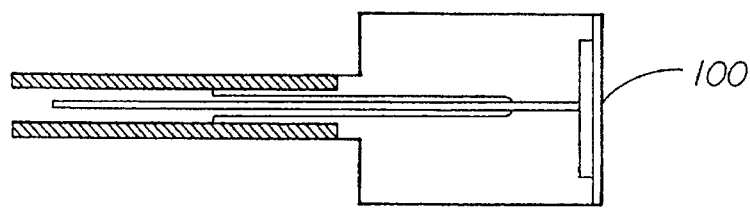
FIG. 10 illustrates a side cross-section view of a flat diaphragm-based fiber optic pressure sensor.

FIGS. 11–14 illustrate improvements to fiber optic diaphragm sensors that are the subject of this continuation-in-part application whereas FIG. 10 illustrates the current form of the embodiment above.

Figure 11:
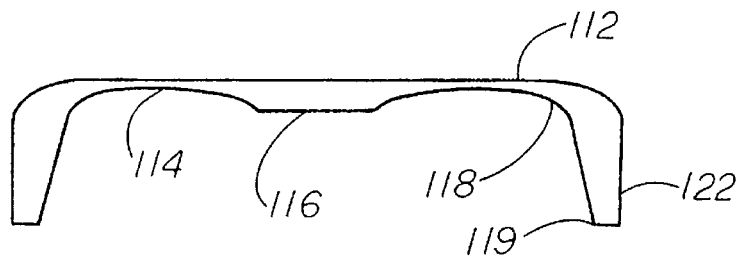
FIG. 11 illustrates a cross-sectional view of a non-uniform thickness diaphragm.

Turning to FIG. 11, the improved characteristics of the sensor construction of this patent application are in large part due to the use of a cup-shaped diaphragm 112. Both the shape and the thickness of the diaphragm 112 vary in the radial direction.

Varying diaphragm dimensions offer three fundamental benefits for fiber optic pressure sensors. Firstly, reduced stress levels are achieved in the flexing diaphragm without reduction of its deflection. Through a thickening of the material in the diaphragm center 116 and the corners 118, stress levels in these areas can be reduced by an order of magnitude compared to those of a flat disk of the same thickness. By thinning the diaphragm thickness about halfway at 114 between the center 116 and the corner 118, maximum deflection of the center 116 is restored to the value of a disk diaphragm 100 in FIG. 10. Under optimized conditions, the cup thickness may vary by as much as 50%. By additional tapering of the vertical wall or skirt 122 thickness, deflection of the center 116 may be further increased.

Secondly, the diaphragm to housing weld joint 119, located at the periphery of the cup, is not exposed to the direct effect of combustion flame; consequently, the weld joint is subjected to much lower temperatures as compared to a flat disk diaphragm 100.

Thirdly, the increased thickness, and associated thermal mass, in the diaphragm center 116 reduces the effect of flame kernel by minimizing the temperature gradient between the center 116 and the edges of the cup 122. In a flat disk design 100 (FIG. 10), hysteresis in combustion pressure response was observed which is believed to be due to localized excess temperature at the diaphragm center.

Figure 12:
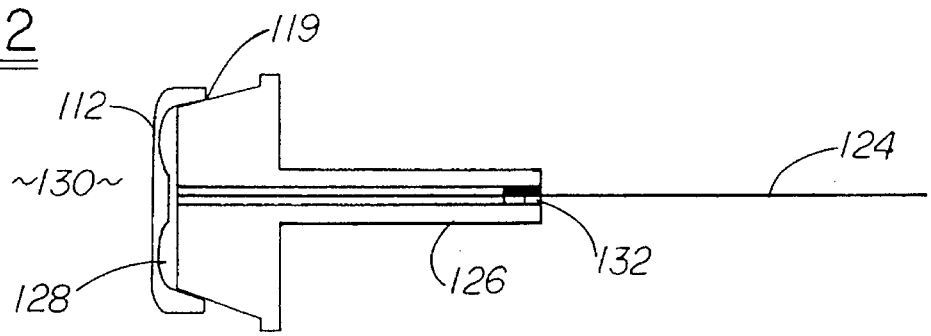
FIG. 12 illustrates a cross-sectional view of a sensor with a fiber-ferrule assembly showing the hermetic seal located at the bottom of the ferrule.

Referring to FIG. 12 another aspect of this invention is the location of the hermetic seal joint between the optical fiber 124 and the holding ferrule 126. As was discussed above in the parent patent application, the cavity 128 between the fiber and the diaphragm needs to remain hermetically sealed throughout sensor's lifetime so diaphragm reflectivity does not degrade due to oxygen diffusion into the cavity. While this hermeticity can be maintained for a short period of time and constant temperature for a fiber brazed at the top of the ferrule, long-term hermeticity may degrade under heat cycling conditions due to large thermal expansion coefficient mismatch between the fused silica fiber and the metal ferrule.

A novel approach of this invention is to move the seal point between the fiber 124 and the ferrule 126 away from the high temperature area 130, near the diaphragm 112, to the bottom of the ferrule at 132, as shown in FIG. 12.

Due to rapid decrease in the sensor temperature moving away from the combustion area 130, resulting from the cooling effect of engine coolant, the operating temperature of the metal ferrule to fiber seal may be as low as 200° C. for a sufficiently long ferrule compared to 600° C. at the diaphragm 112 of the sensor. In a spark plug-integrated version of the sensor, the hermetic seal joint may be right at the ground electrode proximal end. Sealing the fiber can be accomplished using relatively low temperature brazing or soldering techniques. Alternatively, a polyimide-based epoxy or a low temperature melting glass can be used to hermetically bond the fiber to the ferrule.

Figure 13:
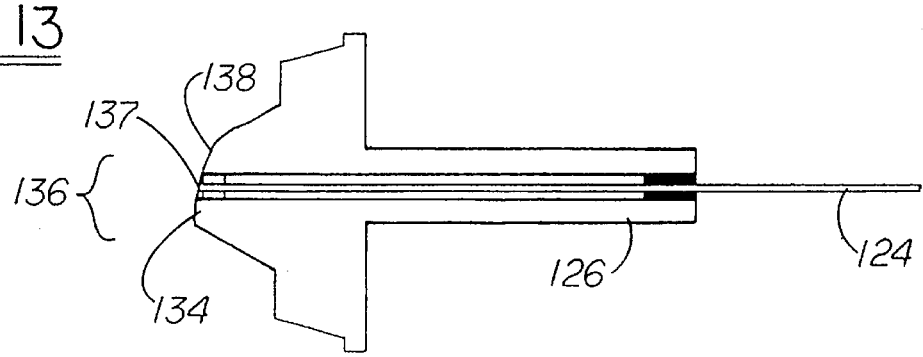
FIG. 13 illustrates a cross-sectional view of a fiber-ferrule showing a mechanical stop for overpressure protection.

Yet another aspect of this invention is the increased resistance of the sensor to overpressure. This resistance is accomplished through the use of a specially shaped and angled metal stop 134 formed on the tip 136 of the fiber ferrule 126 as shown in FIG. 13. The shape of the ferrule tip 136 allows the center 116 of the diaphragm (not shown) to hit the ferrule 126 without damaging the fiber 124 when pressure exceeds its normal operating range. The angle 138 of the tip 136 can be between 5 and 10 degrees, sufficient enough to protect the tip 137 of the optical fiber 124 up to maximum overpressure value.

Figure 14:
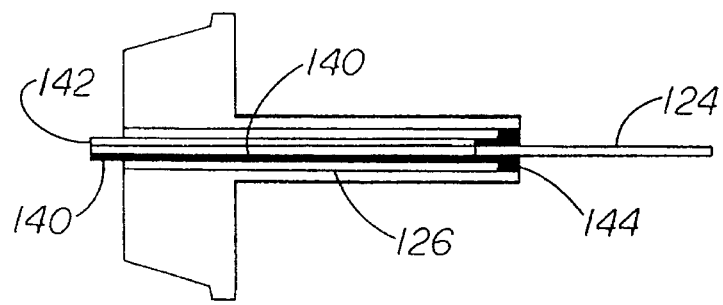
FIG. 14 illustrates a cross-sectional view of a sensor housing with a fiber-ferrule having one section of the ferrule polished to provide a mechanical stop for overpressure protection.

An alternative sensor housing/fiber ferrule design, wherein the optical fiber 124 is held in a separate inner tubular ferrule 140 inside the larger ferrule 126, is shown in FIG. 14. A section of the tip 142 of the ferrule 140 that holds the fiber is polished at an angle that can range from 80 to 85 degrees to the ferrule axis, with the rest of the tip of the ferrule polished perpendicularly to the ferrule axis to resemble the configuration of FIG. 13.

The ferrule 140 position with respect to the diaphragm 112 (not shown) is adjusted using a low cost and correctable brazing process as opposed to a laser welding technique. The use of a brazed joint 144 with the outer ferrule 126 allows for the ferrule's active positioning in respect to the diaphragm 112, and possible adjustment, when the ferrule 140 moves unpredictably due to the solder material solidification. This approach is different from the laser welding technique when unpredictable and uncorrectable movements of the ferrule 140 can force the fiber tip 142 to recede or to extend too far with respect to the diaphragm. One way of positioning the ferrule 140 is to contact it with the diaphragm center 116, then deflect the diaphragm 112 to a particular value of pressure (typically beyond its nominal pressure range) and then braze the inner ferrule 140 in place at its proximal end 144 to the larger ferrule 126.

In an alternative approach, the optical signal can be monitored during the brazing process to allow adjustment of the ferrule 140 position for a particular value of optical signal. If the ferrule is too close or too far in respect to the diaphragm 112, the detected signal is too high or too low. The brazed joint may be heated above its melting point and the ferrule 140 can be moved into a new position. Two to three iterations are found to result in the final fiber tip position within a few microns from fiber-to-diaphragm target position.

I claim:

1. In a fiber optic diaphragm sensor comprising a ferrule and having a cavity therein, a diaphragm attached to the ferrule and partially enclosing the cavity, the diaphragm being moveable in response to changes in fluid pressure exerted upon the diaphragm, the diaphragm comprising a top, an underside, a periphery, and a skirt depending from the top and terminating at the periphery, the skirt being thicker nearer the top than at the periphery, an optical fiber inserted in the ferrule with the tip end of the optical fiber in communication with the cavity, the tip end being disposed to inject a light beam toward the diaphragm and to receive a light beam reflected from the diaphragm underside, the center of the diaphragm being thicker than an annular portion about the center.

2. The fiber optic diaphragm sensor according to claim 1 wherein the top forms a radius with the depending skirt.

3. The fiber optic diaphragm sensor according to claim 2 wherein the depending skirt thickness tapers decreasingly from near the underside to the periphery of the depending skirt.

4. In a fiber optic diaphragm sensor comprising a ferrule and having a cavity therein, a diaphragm attached to the ferrule and partially enclosing the cavity, the diaphragm being moveable in response to changes in fluid pressure exerted upon the diaphragm, the ferrule having a first end near the diaphragm and a second end away from the diaphragm, an optical fiber inserted in the ferrule with the tip end of the optical fiber in communication with the cavity, the tip end being disposed to inject a light beam toward the diaphragm and to receive a light beam reflected from the diaphragm, and means for sealing the ferrule hermetically to the optical fiber nearer the second end of the ferrule away from the diaphragm, said ferrule of sufficient length to provide a substantial temperature differential along the length of the ferrule.

5. The fiber optic diaphragm sensor according to claim 4 wherein the means for sealing comprises a low temperature activating means.

6. The fiber optic diaphragm sensor according to claim 4 wherein the means for sealing comprises soldering.

7. The fiber optic diaphragm sensor according to claim 4 wherein the means for sealing comprises brazing.

8. The fiber optic diaphragm sensor according to claim 4 wherein the means for sealing comprises polyimide-based epoxy.

9. The fiber optic diaphragm sensor according to claim 4 wherein the means for sealing comprises low temperature melting glass.

10. A process for positioning a ferrule having a distal and a proximal end relationship to a diaphragm in a fiber optic sensor comprising contacting the distal end of the ferrule to the diaphragm, deflecting the diaphragm to an extent reflecting a preselected particular value of pressure; and fastening the ferrule in place at the proximal end.

11. In a fiber optic diaphragm sensor comprising a ferrule and having a cavity therein, a diaphragm attached to the ferrule and partially enclosing the cavity, the diaphragm being moveable in response to changes in fluid pressure exerted upon the diaphragm, an optical fiber inserted in the body, the optical fiber terminating adjacent the diaphragm, a stop formed on the ferrule, the stop being adjacent the diaphragm, and a part of the stop being angled whereby when the diaphragm under an excessive pressure contacts the ferrule, the angled part of the stop prevents damage to the optical fiber and ferrule.

12. The fiber optic diaphragm sensor according to claim 11 wherein the stop comprises metal.

13. The fiber optic diaphragm sensor according to claim 11 wherein the stop is angled between 5 to 10 degrees.

14. In a fiber optic diaphragm sensor comprising an outer ferrule and having a cavity therein, a diaphragm attached to the outer ferrule and partially enclosing the cavity, the diaphragm being moveable in response to changes in fluid pressure exerted on the diaphragm, and an optical fiber inserted in an inner ferrule, the outer ferrule surrounding the inner ferrule, and the inner ferrule extending into the cavity to form a tip therein, the tip of the inner ferrule near the diaphragm being at least partly polished at an angle to form a stop for the diaphragm to prevent damage to the diaphragm, optical fiber and ferrule when the diaphragm is subjected to excessive pressure.

15. The fiber optic diaphragm sensor according to claim 14 wherein the angle the tip of the inner ferrule is polished to is from 80 to 85 degrees.

* * * * *